United States Patent [19]

Blatt

[11] Patent Number: 4,905,973

[45] Date of Patent: Mar. 6, 1990

[54] POWER OPERATED CLAMP WITH EXTERNALLY MOUNTED ADJUSTABLE CLAMP ARM

[76] Inventor: John A. Blatt, 47 Willison, Grosse Pointe Shores, Mich. 48236

[21] Appl. No.: 295,767

[22] Filed: Jan. 11, 1989

[51] Int. Cl.[4] .................... B23Q 3/03

[52] U.S. Cl. .................... 269/32; 269/228

[58] Field of Search .................... 269/25, 27, 32, 228, 269/24, 91, 93, 94, 239

[56] References Cited

U.S. PATENT DOCUMENTS

| | | | |
|---|---|---|---|
| 2,845,847 | 8/1958 | Blatt et al. | 90/59 |
| 3,545,050 | 12/1970 | Blatt et al. | 24/248 |
| 3,570,835 | 3/1971 | McPherson | 269/32 |
| 3,618,931 | 11/1971 | Blatt | 269/94 |
| 3,702,185 | 11/1982 | Blatt | 269/32 |
| 4,021,027 | 5/1977 | Blatt | 269/32 |
| 4,458,889 | 7/1984 | McPherson et al. | 269/32 |
| 4,496,138 | 1/1985 | Blatt | 269/32 |
| 4,570,914 | 2/1986 | Blatt | 269/32 |
| 4,620,696 | 11/1986 | Blatt | 269/32 |
| 4,637,597 | 1/1987 | McPherson et al. | 269/32 |

FOREIGN PATENT DOCUMENTS 2555207 7/1976 Fed. Rep. of Germany .

*Primary Examiner*—Judy Hartman

*Attorney, Agent, or Firm*—Basile and Hanlon

[57] ABSTRACT

The power operated clamp secures a workpiece relative to a work piece support and includes a cylinder having a reciprocal piston and connected piston rod projecting from the cylinder. A bifurcated hollow housing is connectable to the cylinder and has an elongated internal guide slot with a free end of the piston rod extending within the guide slot. A pair of coaxial apertures having a common axis offset and the perpendicular to a longitudinal axis of the guide slot are formed in the housing. A rod end is connected to the free end of the piston rod for reciprocal movement and is slidingly guided within the guide slot. A pivot pin is rotatably disposed within the coaxial apertures for angular movement about the common axis and has an end extending externally from the housing and a lever arm extending internally within the housing. A pair of opposed links are pivotally connected to the rod end at one end and pivotally connected to the lever arm at another end for transforming the reciprocal movement of the rod end into angular movement of the pivot pin. A clamp arm is connected to the external end of the pivot pin for movement between workpiece clamping and release positions. Shaped mating surfaces are formed on the claim arm and the external end of the pivot pin for adjusting the angular orientation of the clamp arm with respect to the clamping position without disassembling the housing.

7 Claims, 3 Drawing Sheets

POWER OPERATED CLAMP WITH EXTERNALLY MOUNTED ADJUSTABLE CLAMP ARM

FIELD OF THE INVENTION

The present invention relates to fluid motor operated power clamps, and more particularly to a hydraulic or pneumatically operated fluid motor type power clamp having a reciprocal piston and piston rod with a mechanical linkage for effecting operative pivotal movement of a clamping arm.

BACKGROUND OF THE INVENTION

Power clamps are known of the type in which a fluid motor actuated reciprocating movement is adapted to be translated into a swinging movement of a clamp arm attached by an additional linkage or other force transmitting means to the end of a piston rod of the fluid motor. Normally, in the retracted position of the fluid motor, the clamp is in released position, that is, the clamp arm is removed from the work supporting surface and by, means of fluid pressure, the clamp arm is pivotally moved into operating, i.e., clamping position to clamp a workpiece to a work supporting surface, and securely hold the workpiece thereagainst by means of fluid pressure in the fluid motor.

Various guide and linkage means have been proposed to correctly translate reciprocating movement of a piston and piston rod to correct swinging movement of a clamping arm into or out of clamping position, seeking to obtain the highest mechanical advantage which can be utilized within the power stroke of the fluid cylinder. All of these known mechanisms, more or less, include complex designs of various mechanical components at high manufacturing and assembly costs.

Clamps of this type are shown in Applicant's U.S. Pat. Nos. 4,620,696; 4,570,914; 4,496,138; 4,021,027; 3,702,185; 3,618,931; and No. 3,545,050. Each of these clamps has a hollow clamp body axially aligned with and connected to the cylinder and mounted upon a first support, wherein the body is open at the top, bottom and front and includes a pair of opposed, spaced side plates with their one ends out-turned and secured to the cylinder. The opposed sides of the clamp arm cooperatively and guidably bear against interior portions of the body plates during movements between workpiece clamping and release positions. The open design of the hollow body allows entry of dirt and/or other foreign matter into the interior of the body, which can create problems with the internal working mechanisms of the power operated clamp. In addition, the internal mounting of the clamp arm limits the flexibility of readily adapting the clamp for different angular orientations with respect to the clamping position. Disassembly of the entire body is generally required in these clamps to replace the clamp arm with another arm having the desired angular form.

SUMMARY OF THE INVENTION

The present invention overcomes the disadvantages of the known clamps, by providing an enclosed hollow clamp body with an externally mounted adjustable clamp arm. The present invention provides a fluid motor operated power clamp, wherein the rectilinear reciprocal motion of a piston and a linkage associated therewith is transmitted to a pivotally mounted clamp mechanism. The linkage and guide arrangement, between an axially movable piston and piston rod assembly and a pivotally mounted clamp arm, allows selective application of fluid pressure through a respective port at opposite ends of the cylinder to effect opening and closing movement of the clamp arm around a fixed pivot.

The present invention of a fluid power operated clamp assembly includes a cylinder, the piston supported within the cylinder for reciprocation therein and a piston rod connected to the piston. A bifurcated housing attached to the cylinder provides a closed enclosure for the internal mechanism of the power operated clamp with an externally mounted adjustable clamp arm. The housing includes opposed, spaced side walls with a flared flange portion adjacent one end for securement to the cylinder. The piston rod extends into the bifurcated housing between the opposed side walls along a longitudinal axis of an elongated internal guide slot. The housing has a pair of coaxial apertures having a common axis offset from and perpendicular to the longitudinal axis of the slot. A rod end is connected to the free end of the piston rod for reciprocal movement and is slidingly guided within the guide slot. A pivot pin is rotatably disposed within the pair of apertures in the housing for angular movement about the common axis. The pivot pin has an end extending externally from the housing and a lever arm extending internally within the housing. A pair of opposed links are pivotally connected to the rod end at one end and pivotally connected to the lever arm at another end for transforming reciprocal movement of the rod end into angular movement of the pivot pin. The clamp arm is connected to the end of the pivot pin external to the housing for movement between workpiece clamping and release positions. Shaped mating surface means are formed on the clamp arm and the end of the pivot pin external to the housing for adjusting the angular orientation of the clamp arm with respect to the clamping position without disassembly of the housing.

Other objects and features of the invention will become apparent by reference to the following specification and to the drawings.

BRIEF DESCRIPTION OF THE DRAWINGS

In the drawings, like reference numerals refer to similar elements throughout the various views.

DESCRIPTION OF THE PREFERRED EMBODIMENT

Figure 1:
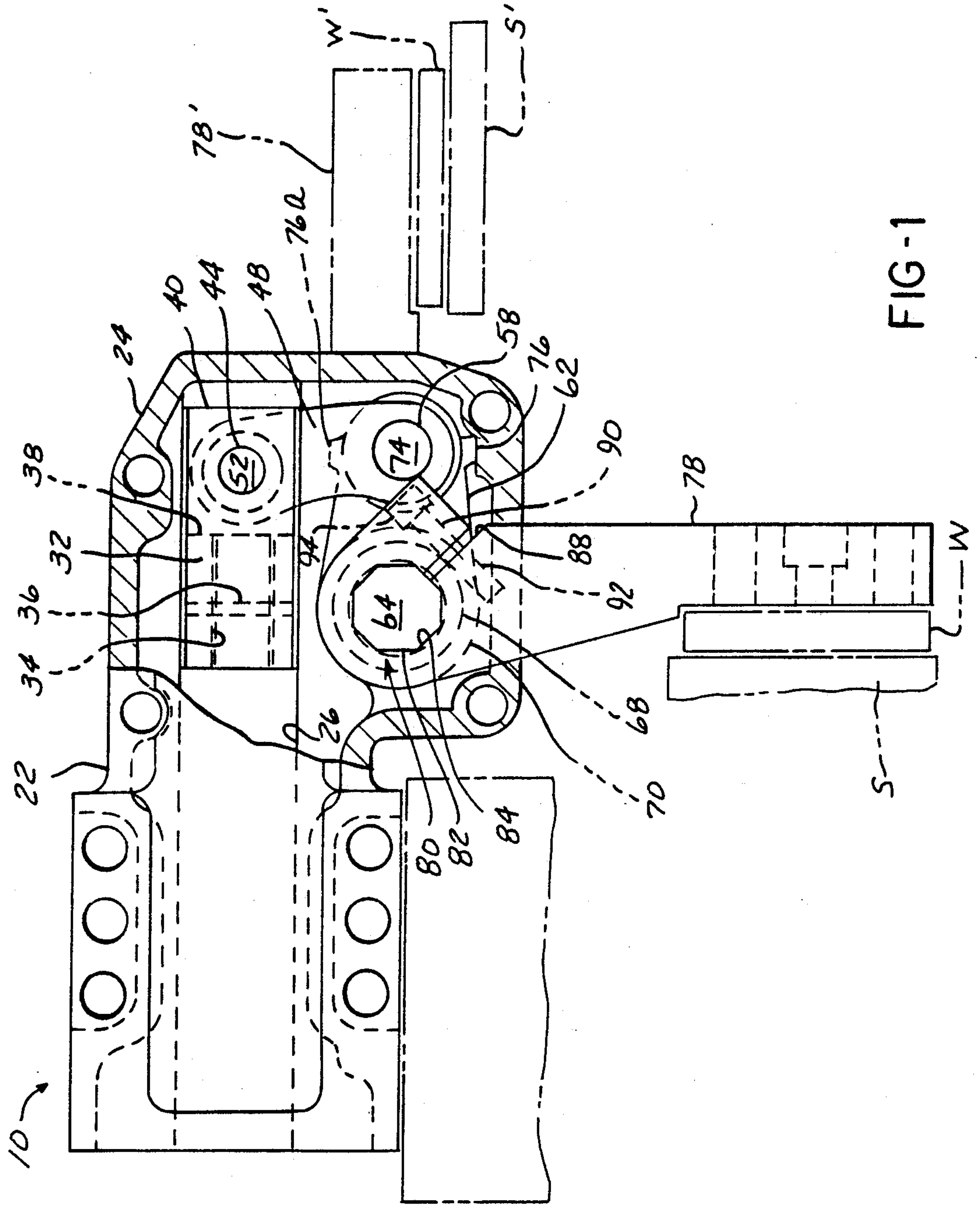
FIG. 1 is a side view of one form embodying the present invention with certain parts omitted or shown in section.

A power clamp assembly 10, according to the present invention, is actuated by means of a fluid cylinder 12 having a piston 14 therein which is attached to a piston rod 16. The cylinder 12 has respective opposite rear and front fluid inlets 18 and 20 which, as is known in the art, are suitably connected by conduits (not shown) to a source of fluid under pressure (not shown). The fluid motor 12 may be hydraulic or pneumatic or, conversely, a mechanical reciprocating device may be used to actuate the power clamp 10 by reciprocation of the rod 16, as will be described hereinafter.

Attached to one end of the power cylinder 12 is a bifurcated hollow housing formed of a first portion 22 and a second portion 24. The housing has an elongated internal guide slot 26 with one end open adjacent the cylinder 12 to receive the free end of the piston rod 16 within the guide slot 26. The other end of the guide slot 26 is closed by the first and second portions of the housing 22 and 24, respectively. The housing also includes a pair of coaxial apertures 28 and 30 having a common axis offset from and perpendicular to a longitudinal axis of the guide slot 26.

A rod end 32 is connected to the free end of the piston rod 16 for reciprocal movement. The rod end 32 is slidingly guided within the guide slot 26. The rod end 32 generally has a rectangular cross section with bevelled edges. A threaded aperture 34 is disposed within one end of the rod end 32 to threadingly engage the free end of the piston rod 16. A lock pin 36 is provided through an aperture in the rod end 32 extending into the threaded aperture 34 engaging the piston rod 16 to prevent disengagement of the piston rod 16 from the rod end 32. The opposite end of the rod end 32 includes a slot 38 formed by two opposed protruding portions 40 and 42 of the rod end 32. A pair of coaxial apertures 44 and 46, having a common axis, are formed in the two opposed protruding portions 40 and 42 of the rod end 32.

A pair of opposed links 48 and 50 are disposed within the slot 38 of the rod end 32 and extend outwardly therefrom. The pair of opposed links 48 and 50 are pivotally connected to the rod end 32 at one end with a pin 52. The pin 52 passes through apertures 54 and 56 in the pair of opposed links 48 and 50, respectively, and engages within the pair of coaxial apertures 44 and 46 in the rod end 32. Apertures 58 and 60 are formed at an opposite end of the pair of opposed links 48 and 50, respectively, for pivotal connection to a lever arm 62 of a pivot pin 64.

Figure 2:
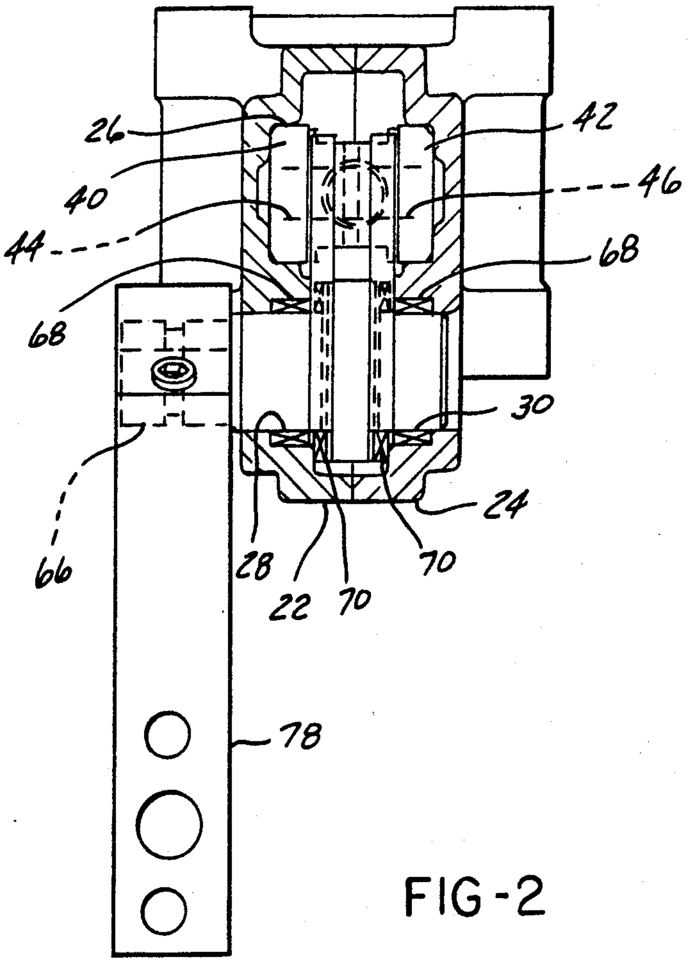
FIG. 2 is an end view of the embodiment shown in FIG. 1 with certain parts omitted or shown in section.
Figure 3:
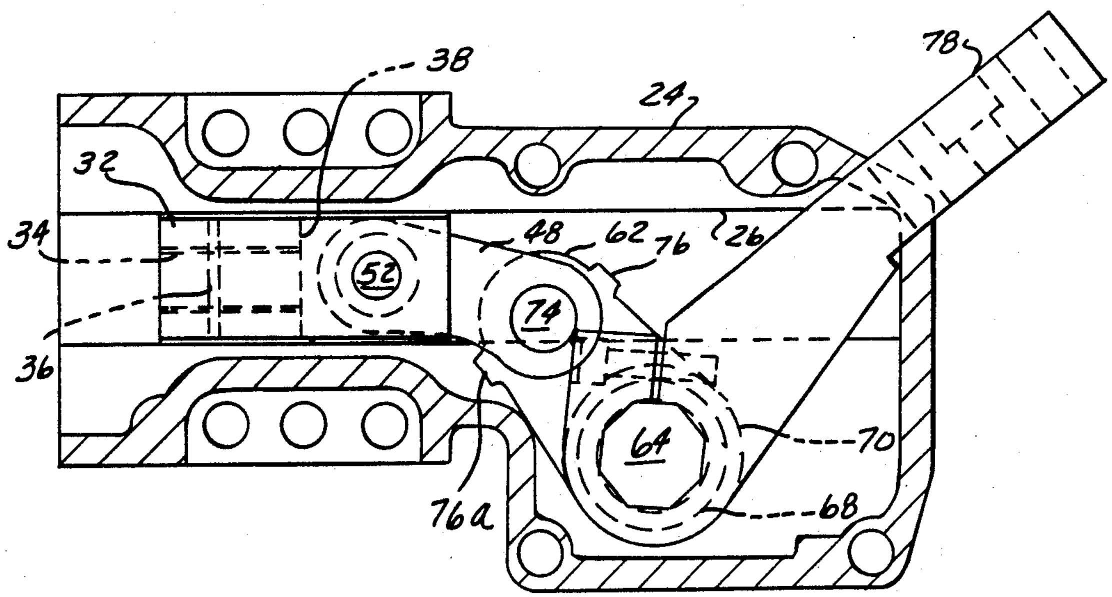
FIG. 3 is a side view of the embodiment shown in FIG. 1 with the clamp arm rotated to a second position with certain parts omitted or shown in section.
Figure 4:
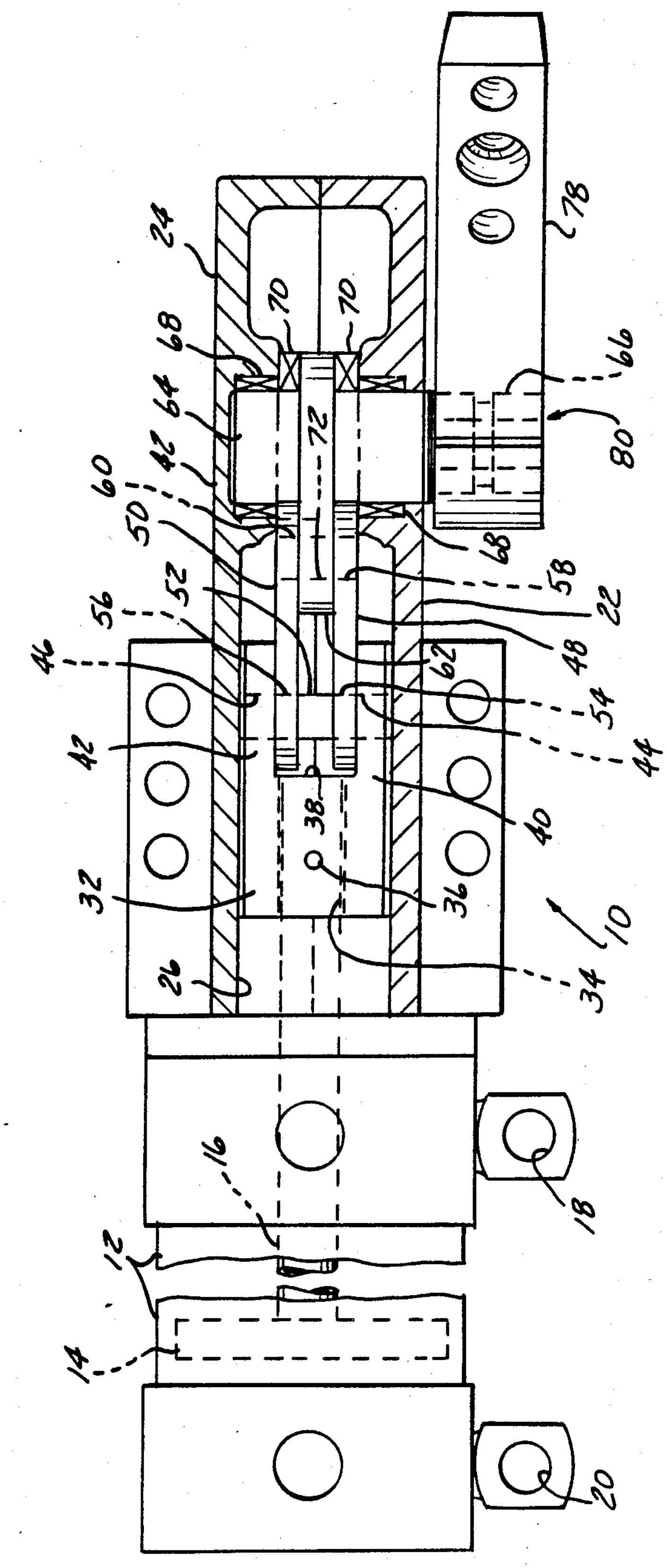
FIG. 4 is a top view of the embodiment shown in FIG. 1 with certain parts omitted or shown in section.

The pivot pin 64 is rotatably disposed within the pair of coaxial apertures 28 and 30 for angular movement about the common axis. The pivot pin 64 has an end 66 extending externally from the housing and a lever arm 62 extending internally within the housing. The pivot pin 64 is connected to the housing through rotational bearings 68 and thrust bearings 70. The lever arm 62 protruding from the pivot pin 64 includes an aperture 72. A pin 74 engages through the aperture 72 in the lever arm 62 and also through the apertures 58 and 60 in the pair of opposed links 48 and 50. The combination of the rod end, the pair of opposed links and the pivot pin with the lever arm provide means for transforming reciprocal movement of the piston rod into angular movement. The lever arm 62 includes a stop 76, which engages an interior wall of the housing in the clamping position. Preferably, the pivot pin 64 is formed in such a way that it is reversible, such that the end 66 extending external to the housing can protrude through aperture 30 in the housing, as opposed to through aperture 28 as shown in FIG. 2. In the reverse configuration, stop 76a is provided to engage with the interior surface of the housing when in the clamping position.

A clamp arm 78 is connected to the external end 66 of the pivot pin 64 for movement between workpiece clamping and release positions. In the workpiece clamping position, the clamp arm 78 holds a workpiece W against a workpiece support S. Reciprocal movements of the rod end 32 under the control of the cylinder assembly and piston rod 16, functioning through the links 48, 50 and pivot pin 64, moves the clamp arm 78 from the solid position shown in FIG. 1 to the retracted or release position shown in FIG. 3. Shaped mating surface means 80 are formed on the clamp arm 78 and the external end 66 of the pivot pin 64 for adjusting the angular orientation of the clamp arm 78 with respect to the clamping position without disassembling the housing. In the preferred embodiment shown, the shaped mating surface means 80 can include a polygonal surface 82, such as an octagonal surface, formed on the external end 66 of the pivotal pin 64 and a mating polygonal aperture 84, such as an octagonal aperture, formed in clamp arm 78. The mating octagonal surfaces 82, 84 allow the clamp arm 78 to be adjusted into a variety of positions without disassembling the housing. One of the possible alternative positions is shown in phantom in FIG. 1, wherein the clamping arm is designated as 78′, clamping the workpiece W′ against a workpiece support S′. The clamp arm 78 is secured to the external end 66 of the pivot pin 64 by mounting means 86. The mounting means 86 can include slot 88, and aperture 90 having a threaded portion 92 matingly engageable with a mounting bolt 94. The preferred embodiment of the invention shown in FIGS. 1 through 4 provides angular movement of the clamp arm from the clamping position to the release position in the range of approximately 120 degrees.

The invention, having been described in connection with what is presently considered to be the most practical and preferred embodiment, it should be understood that the invention is not to be limited to the disclosed embodiment but, on the contrary, is intended to cover various modifications and equivalent arrangements included within the spirit and scope of the appended claims, which scope is to be accorded the broadest interpretations as to encompass all such modifications and equivalent structures.

What is claimed is:

1. A power operated clamp for securing a workpiece relative to a workpiece support, said clamp including a cylinder having a reciprocal piston and connected piston rod projecting from said cylinder, said clamp comprising:

a bifurcated hollow housing connectable to said cylinder, said housing having an elongated internal guide slot with a free end of said piston rod extending within said slot, and a pair of coaxial apertures having a common axis offset from and perpendicular to a longitudinal axis of said slot;

a rod end connected to said free end of said piston rod for reciprocal movement, said rod end slidingly guided within said guide slot;

a pivot pin rotatably disposed within said apertures for angular movement about said common axis, said pivot pin having an end extending externally from said housing and a lever arm extending internally within said housing;

a pair of opposed links pivotally connected to said rod end at one end and pivotally connected to said lever arm at another end for transforming reciprocal movement of said rod end into angular movement of said pivot pin;

a clamp arm connected to said end of said pivot pin external to said housing for movement between workpiece clamping and release positions;

a stop formed on said lever arm of said pivot pin engageable with said housing when said clamp arm is in said clamping position; and shaped mating surface means formed on said clamp arm and said end of said pivot pin for adjusting the angular orientation of said clamp arm with respect to said clamping position without disassembling said housing.

2. The clamp of claim 1, wherein said surface means comprises an octagonal surface formed on said end of said pivot pin and mating octagonal aperture formed in said clamp arm.

3. The clamp of claim 1, wherein said pivot pin is reversible such that said end external to said housing can be disposed through either aperture.

4. A power operated clamp for securing a workpiece relative to a workpiece support, said clamp including a cylinder having a reciprocal piston and connected piston rod projecting from said cylinder, said clamp comprising:

a hollow enclosure connectable to said cylinder, said enclosure having elongated internal guide slot means for receiving a free end of said piston rod extending within said guide slot means and a pair of coaxial apertures having a common axis offset from and perpendicular to a longitudinal axis of said guide slot means;

pivot pin means rotatably disposed within said apertures for angular movement about said common axis, said pivot pin means having an end extending externally from said enclosure;

linkage means for transforming reciprocal movement of said free end of said piston rod into angular movement of said pivot pin, said linkage means connected to said free end of said piston rod at one end and at another end connected to said pivot pin means, said linkage means including:

rod end means connected to said free end of said piston rod for reciprocal movement, said rod end means slidingly guided within said guide slot means;

lever arm means connected to said pivot pin extending internally within said enclosure for angular movement about said axis; and link means pivotally connected to said rod end means at one end and pivotally connected to said lever arm means at another end for transforming reciprocal movement of said rod end means into angular movement of said pivot pin means;

a clamp arm connected to said end of said pivot pin means external to said enclosure for movement between workpiece clamping and release positions;

polygonal shaped mating surface means formed on said clamp arm and said end of said pivot pin means for adjusting the angular orientation of said clamp arm with respect to said clamping position without disassembling said enclosure; and a stop formed on said lever arm means of said pivot pin means engageable with an internal surface of said enclosure when said clamp arm is in said clamping position.

5. The clamp of claim 4 wherein said surface means comprises an octagonal surface formed on said end of said pivot pin means and a mating octagonal aperture formed in said clamp arm.

6. The clamp of claim 4 wherein said pivot pin means is reversible such that said end external to said enclosure can be disposed through either aperture.

7. A power operated clamp for securing a workpiece relative to a workpiece support, said clamp including a cylinder having a reciprocal piston and connected piston rod projecting from said cylinder, said clamp comprising:

a bifurcated hollow housing connectable to said cylinder, said housing having an elongated internal guide slot with a free end of said piston rod extending within said slot, and a pair of coaxial apertures having a common axis offset from and perpendicular to a longitudinal axis of said slot;

a rod end connected to said free end of said piston rod for reciprocal movement, said rod end slidingly guided within said guide slot;

a pivot pin rotatably disposed within said apertures for angular movement about said common axis, said pivot pin having an end extending externally from said housing and a lever arm extending internally within said housing, said end having an octagonal surface external of said housing;

a pair of opposed links pivotally connected to said rod end at one end and pivotally connected to said lever arm at another end for tranforming reciprocal movement of said rod end into angular movement of said pivot pin;

a clamp arm connected to said end of said pivot pin external to said housing for movement between workpiece clamping and release positions, said clamp arm having a mating octagonal aperture formed in said clamp arm for engagement with said octagonal surface formed on said end of said pivot pin external to said housing, such that the mating octagonal surfaces formed on the clamp arm and the end of the pivot pin allow adjustment of the angular orientation of the clamp arm with respect to the clamping position without disassembling the housing; and a stop formed on said lever arm of said pivot pin engageable with said housing when said clamp arm is in said clamping position.

* * * * *

US004905973B1

REEXAMINATION CERTIFICATE (2327th)

United States Patent [19]

[11] B1 4,905,973

Blatt

[45] Certificate Issued Jul. 5, 1994

[54] POWER OPERATED CLAMP WITH EXTERNALLY MOUNTED ADJUSTABLE CLAMP ARM

[76] Inventor: John A. Blatt, 47 Willison, Grosse Pointe Shores, Mich. 48236

Reexamination Request:
No. 90/003,193, Sep. 13, 1993

Reexamination Certificate for:

| | |
|---|---|
| Patent No.: | 4,905,973 |
| Issued: | Mar. 6, 1990 |
| Appl. No.: | 295,767 |
| Filed: | Jan. 11, 1989 |

[51] Int. Cl.[5] ........ B23Q 3/03
[52] U.S. Cl. ........ 269/32; 269/228
[58] Field of Search ........ 269/25, 27, 32, 228, 269/24, 91, 93, 94, 239

[56] References Cited

U.S. PATENT DOCUMENTS

| | | | |
|---|---|---|---|
| 2,845,847 | 8/1958 | Blatt et al. | 90/59 |
| 3,545,050 | 12/1970 | Blatt et al. | 24/248 |
| 3,570,835 | 3/1971 | McPherson | 269/32 |
| 3,618,931 | 11/1971 | Blatt | 269/94 |
| 3,702,185 | 11/1982 | Blatt | 269/32 |
| 4,021,027 | 5/1977 | Blatt | 269/32 |
| 4,458,889 | 7/1984 | McPherson et al. | 269/32 |
| 4,496,138 | 1/1985 | Blatt | 269/32 |
| 4,570,914 | 2/1986 | Blatt | 269/32 |
| 4,620,696 | 11/1986 | Blatt | 269/32 |
| 4,637,597 | 1/1987 | McPherson et al. | 269/32 |

FOREIGN PATENT DOCUMENTS

| | | |
|---|---|---|
| 2555207 | 7/1976 | Fed. Rep. of Germany . |
| 2340798 | 8/1980 | France . |

*Primary Examiner*—Robert C. Watson

[57] ABSTRACT

The power operated clamp secures a workpiece relative to a work piece support and includes a cylinder having a reciprocal piston and connected piston rod projecting from the cylinder. A bifurcated hollow housing is connectable to the cylinder and has an elongated internal guide slot with a free end of the piston rod extending within the guide slot. A pair of coaxial apertures having a common axis offset and the perpendicular to a longitudinal axis of the guide slot are formed in the housing. A rod end is connected to the free end of the piston rod for reciprocal movement and is slidingly guided within the guide slot. A pivot pin is rotatably disposed within the coaxial apertures for angular movement about the common axis and has an end extending externally from the housing and a lever arm extending internally within the housing. A pair of opposed links are pivotally connected to the rod end at one end and pivotally connected to the lever arm at another end for transforming the reciprocal movement of the rod end into angular movement of the pivot pin. A clamp arm is connected to the external end of the pivot pin for movement between workpiece clamping and release positions. Shaped mating surfaces are formed on the claim arm and the external end of the pivot pin for adjusting the angular orientation of the clamp arm with respect to the clamping position without disassembling the housing.

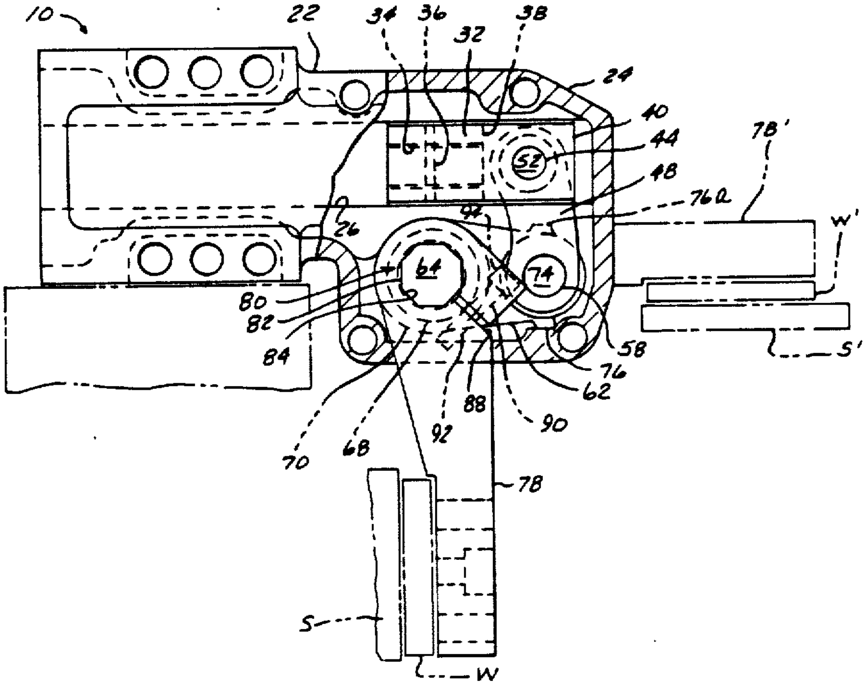

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

New claims 8-14 are added and determined to be patentable.

*8. A power operated clamp for securing a workpiece relative to a workpiece support, said clamp including a cylinder having a reciprocal piston and connected piston rod projecting from said cylinder, said clamp comprising:*

*an elongated, hollow enclosure connectable to said cylinder, said enclosure longitudinally bifurcated into two halves, each half having a portion of an elongated internal guide slot with a free end of said piston rod extending within said slot, said enclosure having a pair of coaxial apertures with a common axis offset from and perpendicular to a longitudinal axis of said slot, said common axis perpendicular to a parting line of said bifurcated enclosure;*

*a rod end connected to said free end of said piston rod for reciprocal movement, said rod end slidingly guided within said guide slot;*

*a pivot pin rotatably disposed within said coaxial apertures for angular movement about said common axis, said pivot pin having an end extending externally from said enclosure, a lever arm formed on said pivot pin extending internally within said hollow enclosure and a stop formed on said lever arm of said pivot pin engageable with an internal surface of said enclosure;*

*a pair of opposed links pivotally connected to said rod end at one end and pivotally connected to said lever arm at another end for transforming reciprocal movement of said rod end into angular movement of said pivot pin;*

*a clamp arm connected to said end of said pivot pin external to said enclosure for movement between workpiece clamping and release positions, said stop formed on said pivot pin engaging said internal surface of said enclosure when said clamp arm is in said clamping position; and*

*shaped mating surface means formed on said clamp arm and said end of said pivot pin for adjusting the angular orientation of said clamp arm with respect to said clamping position without disassembling said enclosure.*

*9. The clamp of claim 8 wherein said rod end, link, lever arm and stop are completely enclosed within said enclosure.*

*10. A power operated clamp for securing a workpiece relative to a workpiece support, said clamp including a cylinder having a reciprocal piston and connected piston rod projecting from said cylinder, said clamp comprising:*

*a hollow enclosure connectable to said cylinder, said enclosure having elongated internal guide slot means for receiving a free end of said piston rod extending within said guide slot means and a pair of coaxial apertures having a common axis offset from and perpendicular to a longitudinal axis of said guide slot means;*

*a pivot pin rotatably disposed within said apertures for angular movement about said common axis, said pivot pin having an end extending externally from said enclosure;*

*a linkage for transforming reciprocal movement of said free end of said piston rod into angular movement of said pivot pin, said linkage connected to said free end of said piston rod at one end and at another end connected to said pivot pin, said linkage including a rod end connected to said free end of said piston rod for reciprocal movement, said rod end slidingly guided within said guide slot means, a lever arm connected to said pivot pin extending internally within said enclosure for angular movement about said axis, and a link pivotally connected to said rod end at one end and pivotally connected to said lever arm at another end for transforming reciprocal movement of said rod end into angular movement of said pivot pin;*

*a clamp arm connected to said end of said pivot pin external to said enclosure for movement between workpiece clamping and release positions;*

*polygonal shaped mating surface means formed on said clamp arm and said end of said pivot pin for adjusting the angular orientation of said clamp arm with respect to said clamping position without disassembling said enclosure; and*

*a stop formed on said lever arm of said pivot pin engageable with an internal surface of said enclosure when said clamp arm is in said clamping position.*

*11. The clamp of claim 10, wherein said enclosure is elongated and bifurcated longitudinally in two halves, each half having a portion of said elongated internal guide slot means and said common axis perpendicular to a parting line of said bifurcated housing.*

*12. The clamp of claim 10, wherein said rod end, link, lever arm and stop are completely enclosed within said enclosure.*

*13. A power operated clamp for securing a workpiece relative to a workpiece support, said clamp including a cylinder having a reciprocal piston and connected piston rod projecting from said cylinder, said clamp comprising:*

*a bifurcated hollow housing connectable to said cylinder, said housing having an elongated internal guide slot with a free end of said piston rod extending within said slot, and a pair of coaxial apertures having a common axis offset from and perpendicular to a longitudinal axis of said slot;*

*a rod end connected to said free end of said piston rod for reciprocal movement, said rod end slidingly guided within said guide slot;*

*a pivot pin rotatably disposed within said apertures for angular movement about said common axis, said pivot pin having an end extending externally from said housing and a lever arm extending internally within said housing;*

*a pair of opposed, elongated links pivotally connected to said rod end at one end and pivotally connected to said lever arm at another end for transforming reciprocal movement of said rod end into angular movement of said pivot pin;*

*a clamp arm connected to said end of said pivot pin external to said housing for movement between workpiece clamping and release positions;*

*a stop formed on said lever arm of said pivot pin engageable with said housing when said clamp arm is in said clamping position to prevent said pair of opposed links from traveling to an over-center position, where a longitudinal axis of said elongated links is disposed perpendicular with respect to said longitudinal axis of said elongated guide slot; and*

*shaped mating surface means formed on said clamp arm and said end of said pivot pin for adjusting the angular orientation of said clamp arm with respect to said clamping position without disassembling said housing.*

*14. A power operated clamp for securing a workpiece relative to a workpiece suport, said clamp including a cylinder having a reciprocal piston and connected piston rod projecting from said cylinder, said clamp comprising:*

*a hollow enclosure connectable to said cylinder, said enclosure having elongated internal guide slot means for receiving a free end of said piston rod extending within said guide slot means and a pair of coaxial apertures having a common axis offset from and perpendicular to a longitudinal axis of said guide slot means;*

*pivot pin means rotatably disposed within said apertures for angular movement about said common axis, said pivot pin means having an end extending externally from said enclosure;*

*linkage means for transforming reciprocal movement of said free end of said piston rod into angular movement of said pivot pin means, said linkage means connected*

*to said free end of said piston rod at one end and at another end connected to said pivot pin means, said linkage means including:*

*rod end means connected to said free end of said piston rod for reciprocal movement, said rod end means slidingly guided within said guide slot means;*

*lever arm means connected to said pivot pin means extending internally within said enclosure for angular movement about said axis; and*

*elongated link means pivotally connected to said rod end means at one end and pivotally connected to said lever arm means at another end for transforming reciprocal movement of said rod end means into angular movement of said pivot pin means;*

*a clamp arm connected to said end of said pivot pin means external to said enclosure for movement between workpiece clamping and release positions;*

*polygonal shaped mating surface means formed on said clamp arm and said end of said pivot pin means for adjusting the angular orientation of said clamp arm with respect to said clamping position without disassembling said enclosure; and*

*a stop formed on said lever arm means of said pivot pin means engageable with an internal surface of said enclosure when said clamp arm is in said clamping position to prevent said elongated link means from traveling to an over-center position, where a longitudinal axis of said elongated link means is disposed perpendicular with respect to said longitudinal axis of said elongated guide slot means.*

* * * * *